United States Patent [19]

Morioka

[11] Patent Number: 5,426,749
[45] Date of Patent: Jun. 20, 1995

[54] BUFFER CONTROL SYSTEM USING SYNONYMIC LINE ADDRESS TO RETRIEVE SECOND TAG PORTION FOR FETCH AND STORE ACCESSES WHILE FIRST TAG PORTION IS INVALIDATED

[75] Inventor: Tetsuya Morioka, Kawasaki, Japan

[73] Assignee: Fujitsu Limited, Kanagawa, Japan

[21] Appl. No.: 39,007

[22] PCT Filed: Aug. 13, 1992

[86] PCT No.: PCT/JP92/01034

§ 371 Date: Apr. 9, 1993

§ 102(e) Date: Apr. 9, 1993

[30] Foreign Application Priority Data

Aug. 15, 1991 [JP] Japan .................. 3-204523

[51] Int. Cl.$^6$ ............................................. G06F 13/24
[52] U.S. Cl. ................................. 395/400; 395/425;
364/243.4; 364/243.41; 364/243.44; 364/DIG. 1
[58] Field of Search ............... 395/250, 400, 425;
364/243.4, 243.41, 243.44, 955.1, 964.2; 371/13, 40.1

[56] References Cited

U.S. PATENT DOCUMENTS

| | | | |
|---|---|---|---|
| 4,803,616 | 2/1989 | Uchiyama et al. | 364/200 |
| 4,811,209 | 3/1989 | Rubinstein | 364/200 |
| 4,825,412 | 4/1989 | Sager et al. | 365/49 |
| 4,914,582 | 4/1990 | Bryg et al. | 364/200 |
| 4,928,239 | 5/1990 | Baum et al. | 364/200 |
| 5,003,459 | 3/1991 | Ramanujan et al. | 364/200 |
| 5,034,885 | 7/1991 | Matoba et al. | 364/200 |
| 5,067,078 | 11/1991 | Talgam et al. | 395/400 |
| 5,109,335 | 4/1992 | Watanabe | 395/400 |
| 5,148,538 | 9/1992 | Celtruda et al. | 395/425 |
| 5,168,560 | 12/1992 | Robinson et al. | 395/425 |
| 5,197,146 | 3/1993 | Lafetra | 395/425 |
| 5,226,133 | 7/1993 | Taylor et al. | 395/425 |
| 5,226,146 | 7/1993 | Milia et al. | 395/425 |
| 5,251,310 | 10/1993 | Smelser et al. | 395/425 |
| 5,301,296 | 4/1994 | Mohri et al. | 395/250 |

FOREIGN PATENT DOCUMENTS

59-218692 12/1984 Japan .
62-80742 4/1987 Japan .

*Primary Examiner*—Thomas C. Lee
*Assistant Examiner*—Moustafa M. Meky
*Attorney, Agent, or Firm*—Nikaido, Marmelstein, Murray & Oram

[57] ABSTRACT

In a buffer storage control system for controlling a buffer storage for a store-through method based on a part of a page address of a logical address and a part of a byte index of the logical address used as a line address, the system includes: a buffer storage DATA for holding data and a tag portion TAG1 provided in a central processing unit CPU to retrieve a hit/mis-hit of data based on a part of the page address of the logical address and a part of the byte address of the logical address as a basic line address, and a tag portion TAG2 provided in a main control unit MCU to retrieve the hit/mis-hit of data by using a synonymic line address which is obtained by changing a variable portion of the basic line address. In a fetch access, the tag portion TAG1 is retrieved by using the basic line address and when the data is hit, the data is transferred from the buffer storage DATA to a source of the fetch access request. When the data is mis-hit, the tag TAG 2 is retrieved by using the synonymic line address. When the data is hit by tag TAG 2, the tag portion TAG 1 is invalidated. When the data is mis-hit by tag TAG 2, the fetch data is moved from the main storage unit MSU to the buffer storage DATA, and transferred to the source of the fetch access request.

4 Claims, 8 Drawing Sheets

BUFFER CONTROL SYSTEM USING SYNONYMIC LINE ADDRESS TO RETRIEVE SECOND TAG PORTION FOR FETCH AND STORE ACCESSES WHILE FIRST TAG PORTION IS INVALIDATED

TECHNICAL FIELD

The present invention relates to a buffer storage control system for controlling a buffer storage in a store-through method based on a part of a page address of a logical address and a part of a byte index of the logical address used as a line address.

BACKGROUND ART

A data processing apparatus includes a buffer storage using high speed and small capacity memory elements used in a central processing unit (CPU). On the other hand, a main storage includes a low speed and large capacity memory elements. Data blocks separated in the main storage are copied and stored on the buffer storage so that it is possible to achieve high speed access from the central processing unit to the main storage by accessing the data blocks copied into the buffer storage.

In general, a set associative method is utilized for a mapping operation from the main storage to the buffer storage. In this method, a plurality of WAYs are provided on a line which is accessed by a part of an address of the data block. The data and the block address except for bits used in the line address, are registered on the WAY. In the buffer storage, a space which registers the data is called a data portion (DATA), and a space which registers the block address is called a tag portion (TAG).

Further, there is a store-through method as a control method of the buffer storage. In this method, when there is no data to be objected for a fetch access, the block including the object data is moved from the main storage to the buffer storage (i.e., move-in operation MI). When performing the store access, the object data is stored in the main storage and the buffer storage. When there is no object data in the buffer storage, the object data is stored only in the main storage.

On the other hand, there are two kinds of addresses for accessing the buffer storage, i.e., one is a method of using only a part of a byte index of the logical address, and the other is a method of using both a part of a page address of the logical address and a part of the byte index of the logical address. The present invention relates to a buffer control storage system using the latter.

In this case, the logical address is used as an address for accessing from a central control unit to a main storage unit, and there are two types of addresses in accordance with a state of the central control unit. One is a real address, and this address is converted to an absolute address to access the main memory by means of a prefix conversion means using a prefix-register. The other is a virtual address, and this address is converted to the absolute address by means of an address conversion means using an address conversion table.

In both address types, the address is divided into the page address for an upper portion of the address and the byte index for a lower portion of the address. Further, before and after the prefix conversion or address conversion, values in the byte index are not changed, and values in the page address are changed. For example, when address bits are given by 01 to 31 and a page size is given by 4 Kbytes, 19 bits (01 to 19) denote the page address portion, and 12 bits (20 to 31) denote the byte index portion.

Further, the central processing unit simultaneously accesses the address conversion buffer and the TAG portion of the buffer storage to achieve high speed pipe-line processing. In this case, since the TAG portion cannot be accessed by using the absolute address which is obtained as a result of the retrieval for the address conversion buffer. Accordingly, in general, a part of the byte address of the logical address is used as the line address for the buffer storage.

When the page size is given by 4 Kbytes and the block size is given by 64 bytes, the logical address which can be used as the line address for the buffer storage is given by bits 20 to 25 so that it becomes 64 bytes $\times$ 64 bytes = 4 Kbytes per one way (WAY). In this method, the number of the WAY is increased to increase capacity of the buffer storage. However, when increasing the number of the WAY, it is necessary to increase the number of the comparison circuit for comparing the absolute address obtained by the address conversion buffer with the absolute address obtained by the TAG portion, or to increase the number of the selection circuit for selecting data of each WAY read from the DATA portion.

As another method, to increase the number of lines without increasing of the number of the WAY, not only a part of the byte address of the logical address, but also a part of the page address, are used as the line address for the buffer storage. In this case, depending on values of the prefix-register or the address conversion table, the block having the same absolute address may be registered on different lines of the buffer storage. For example, when the page size is given by 4 Kbytes and the block size is given by 64 bytes, and when bits 18 to 25 of the logical address are used as the line address of the buffer storage, the block having the same absolute address may be registered on four lines since bits 18 and 19 are variable for the logical address and the absolute address. This is well-known as a problem of a synonymity to persons skilled in the art.

In the present invention, a line address, which is shown by the logical address bit and applied as an address requested, is called a basic line address. Further, a line address, which is obtained by change of bits of the page address, is called a synonymic line address. In the central processing unit having the buffer storage and using the store-through method, the present invention can effectively control the buffer storage.

DISCLOSURE OF THE INVENTION

According to the present invention, in a buffer storage control system for controlling a buffer storage for a store-through method based on a part of a page address of a logical address and a part of a byte index of the logical address by using as a line address, the system includes:

a buffer storage DATA for holding data and a tag portion TAG1 provided in a central processing unit CPU to retrieve a hit/mis-hit of data based on a part of the page address of the logical address and a part of the byte address of the logical address as a basic line address, and a tag portion TAG2 provided in a main control unit MCU to retrieve the hit/mis-hit of data by using a synonymic line address which is obtained by changing a variable portion of the basic line address;

wherein, in a fetch access, the tag portion TAG1 is retrieved by using the basic line address and when the data is hit, the data is transferred from the buffer storage DATA to a source of the fetch access request, on the other hand, when the data is mis-hit, the tag TAG2 is retrieved by using the synonymic line address, further, when the data is hit, the tag portion TAG1 is invalidated, when the data is mis-hit, the fetch data is moved from the main storage unit MSU to the buffer storage DATA, and transferred to the source of the fetch access request; and in a store access, the tag portion TAG1 is retrieved by using the basic line address and when the data is hit, the data is stored in the buffer storage DATA and the main storage unit MSU, on the other hand, when the data is mis-hit, the tag portion TAG2 is retrieved by using synonymic line address, when the data is hit, the tag portion TAG1 is invalidated, and when the data is mis-hit, the data is stored in the main storage unit MSU.

In one preferred embodiment, in the store access, the tag portion TAG1 is retrieved by using the basic line address and when the data is mis-hit, the tag portion TAG2 is retrieved by using the synonymic line address, when the data is hit, the following fetch access to the same block is prohibited until the tag portion TAG1 is invalidated, or the mis-hit of data is clarified.

In another preferred embodiment, in the store access, the tag portion is retrieved by using the basic line address and when the data is mis-hit, the retrieval to the tag portion TAG2 is omitted when the tag portion TAG2 is retrieved or is on retrieval by using the synonymic line address in the previous store access to the same block.

In still another preferred embodiment, when another source of the store access request performs the store access, the tag portion TAG2 is retrieved by using the synonymic line address including the basic line address and when any one of data is hit, an entry of the tag portion TAG1 is invalidated.

BEST MODE OF CARRYING OUT THE INVENTION

Before explaining preferred embodiments of the present invention, a conventional art and its problem will be explained below.

Conventionally, the problem of the synonymity may occur as follows. The block having the same absolute address has a possibility of being registered to a plurality of line addresses. In a store access, when the store access is performed to only the block existing for the basic line address, and when the store access is not performed to the block existing for the synonymic line address, an old data existing for a previous synonymic line address is fetched in the following fetch access.

For example, the logical addresses $\alpha 00$ and $\alpha 01$ may be converted to the absolute address $\beta$, and the block B may be registered to the line address L00 and L01 of the buffer storage in the fetch access. The problem of the synonymity may occur for the following cases.

(1) When the block B is registered in only the line address L00, and when the fetch access is performed to the logical address $\alpha 00$ after the store access is performed to the logical address $\alpha 01$, the old data is fetched.

(2) When the block B is registered in the line addresses L00 and L01, and when the fetch access is performed to the logical address $\alpha 00$ after the store access is performed to the logical address $\alpha 01$, the old data is fetched.

As a method for solving the problem of the synonymity, there is the document, for example, the Japanese Examined Patent Publication No. 56-16982. In this document, the problem of the synonymity is solved as follows.

(a) In the fetch access or store access, when the block does not exist in the access for the basic line address of the buffer storage TAG, the retrieval is performed by the synonymic line address obtained by changing the variable portion of the page address of the logical address of the buffer storage TAG. When the block exists thereto, that block is invalidated.

(b) In the fetch access, when the block exists in the access for the basic line address of the buffer storage TAG, the data is used. When the block does not exist, the move-in request is generated to the main storage unit.

(c) In the store access, when the block exists in the access for the basic line address of the buffer storage TAG, the store access is performed to the buffer storage and the main storage, and when the block does not exist, the store access is performed to only the main storage unit.

(d) When the block receives the block invalidation request from another calculation apparatus, the retrieval is performed for the basic line address obtained by not changing the variable portion of the page address of the logical address of the buffer TAG, and for the synonymic line address obtained by changing the variable portion of the page address, and when the block exists, the block is invalidated.

However, above conventional method, there are two problems for the performance.

(1) In the fetch access and the store access, when the block does not exist in the access for the basic line address of the buffer storage TAG, it is necessary to retrieve the synonymic line address of the buffer storage TAG. The problem occurs as the requested access or the following access is not processed during the above interval. Further, the problem occurs as many cycles are required to retrieve all synonymic line addresses.

(2) When the block receives the block invalidation request from another calculation apparatus, it is necessary to retrieve all line addresses by changing the page address of the logical address. The problem occurs when the access from the calculation unit cannot be processed during this interval. Further, the problem occurs when many cycles are required to retrieve all line addresses.

That is, in the fetch access, the TAG1-15 is retrieved by the basic line address and when the data is hit, the data is transferred from the buffer storage Data 16 to the source of the fetch access request, when the data is mis-hit, the TAG-21 is retrieved by the synonymic line address. When the data is hit, the data is transferred to the source of the fetch access request after the TAG-15 is invalidated, or after the fetch data is moved from the MSU3 to the buffer storage DATA 16 when the data is mis-hit.

Further, in the store access, the TAG1-15 is retrieved by the basic line address and when the data is hit, the store data is stored in the buffer storage DATA 16 and the MSU3, on the other hand, when the data is mis-hit, the TAG2-21 is retrieved by the synonymic line address. Further, when the data is hit, the store data is stored in the MSU3 after the TAG1-15 is invalidated, or when the data is mis-hit.

Still further, in the store access, the TAG1-15 is retrieved by basic line address and when the data is mis-hit, and the following fetch access to the same block is prohibited until the TAG1-15 is invalidated when the TAG1-15 is retrieved by using the synonymic line address, or the mis-hit is clarified.

Still further, in the store access, the TAG1-15 is retrieved by the basic line address and when the data is mis-hit, the retrieval for the TAG2-21 is omitted when the TAG2-21 is retrieved or on retrieval by using the synonymic line address in the previous store access to the same block.

Still further, when another source of the store access request is performed the store access, the TAG1-15 is retrieved by using the synonymic line address (including the basic line address). When the data is hit, the entry of the TAG1-15 is invalidated.

According to the present invention, in the store-through method, to solve the above problems, that the TAG1 in the CPU is retrieved by using a basic line address consisting of a part of the page address and a part of the byte index. When the data is mis-hit in the TAG1, the TAG2 in the main control unit MCU is retrieved by the synonymic line address so that it is possible to prevent deterioration caused by the synonymity, and to improve the performance of the access.

Figure 1A:
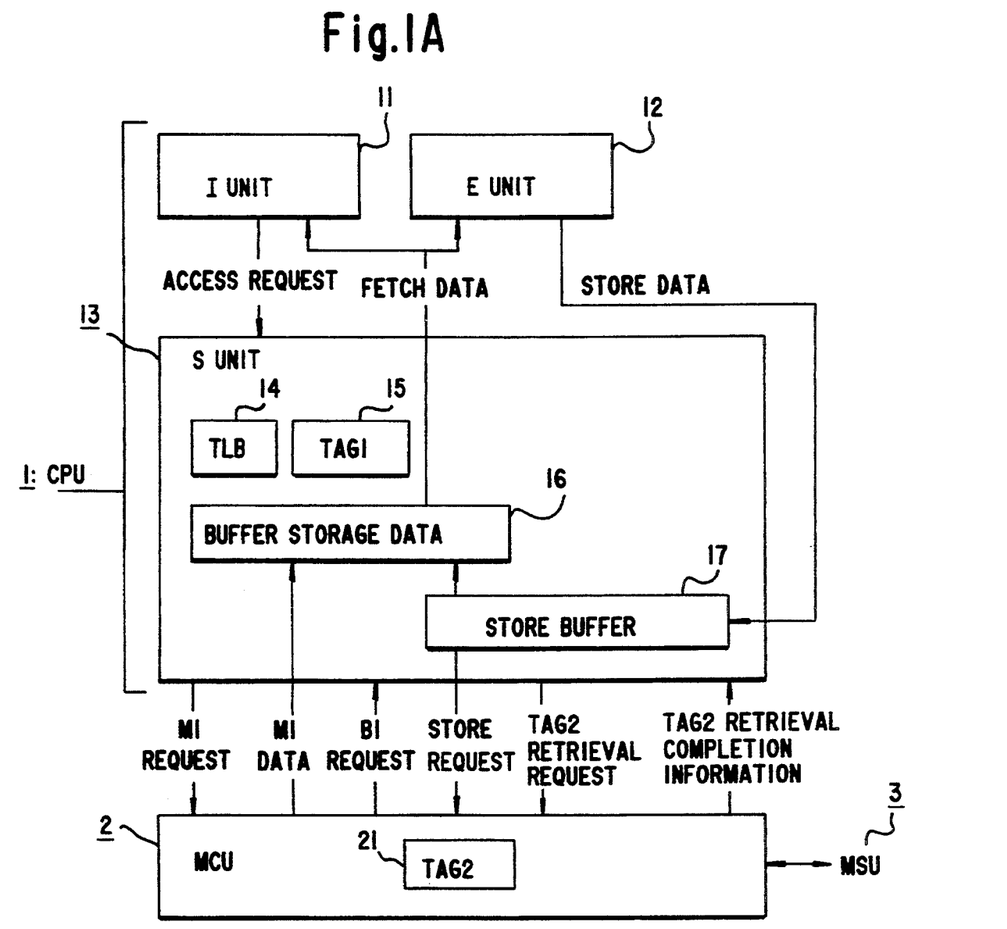
FIG. 1A is a principle block diagram of the present invention.

The present invention will be explained in detail below. FIG. 1A is a principle block diagram of the present invention. In FIG. 1A, TAG1-15 is provided for detecting the hit/mis-hit for the basic line address consisting of a part of the page address (18, 19) of the logical address and a part of the byte address (20 to 25) of the logical address as shown by bits 18 to 25 of FIG. 1B. The buffer storage DATA 16 holds the data of the address registered in the TAG1-15. The TAG2-21 of the MCU retrieves the hit/mis-hit of the data by using the synonymic line address which is obtained by changing the variable portion of the basic line address.

The MCU2 is provided for controlling the MSU (main storage). In the present invention, the TAG1-15 and the buffer storage DATA-16 are provided in the CPU1, and the TAG2-21 is provided in the MCU2.

Next, the structure and operation of the present invention will be explained with reference to FIGS. 1 to 3, and embodiments are explained with reference to FIGS. 4 to 8. In FIG. 1A, the CPU1 is formed by the I unit 11 (central control unit), the E unit (central execution unit) 12, and the S unit (storage control unit) 13. The S unit 13 is formed by the TLB-14, the TAG1-15, the IF buffer storage DATA-16, and the store buffer 17.

Figures 6, 7:
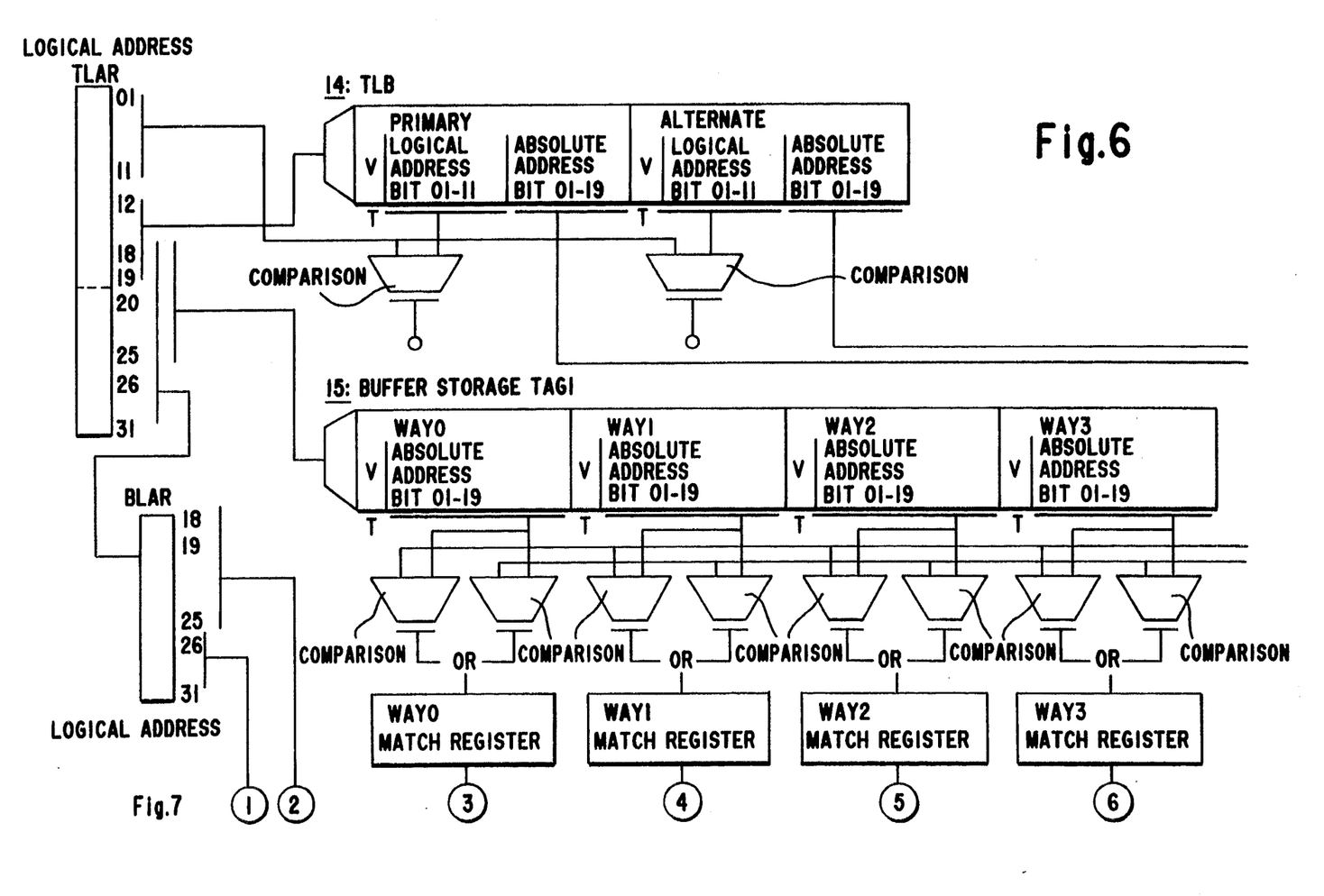
FIG. 6 is one example of TAG/DATA portions in a CPU (No. 1)
FIG. 7 is one example of TAG/DATA portions in a CPU (No. 2)
Figure 7:
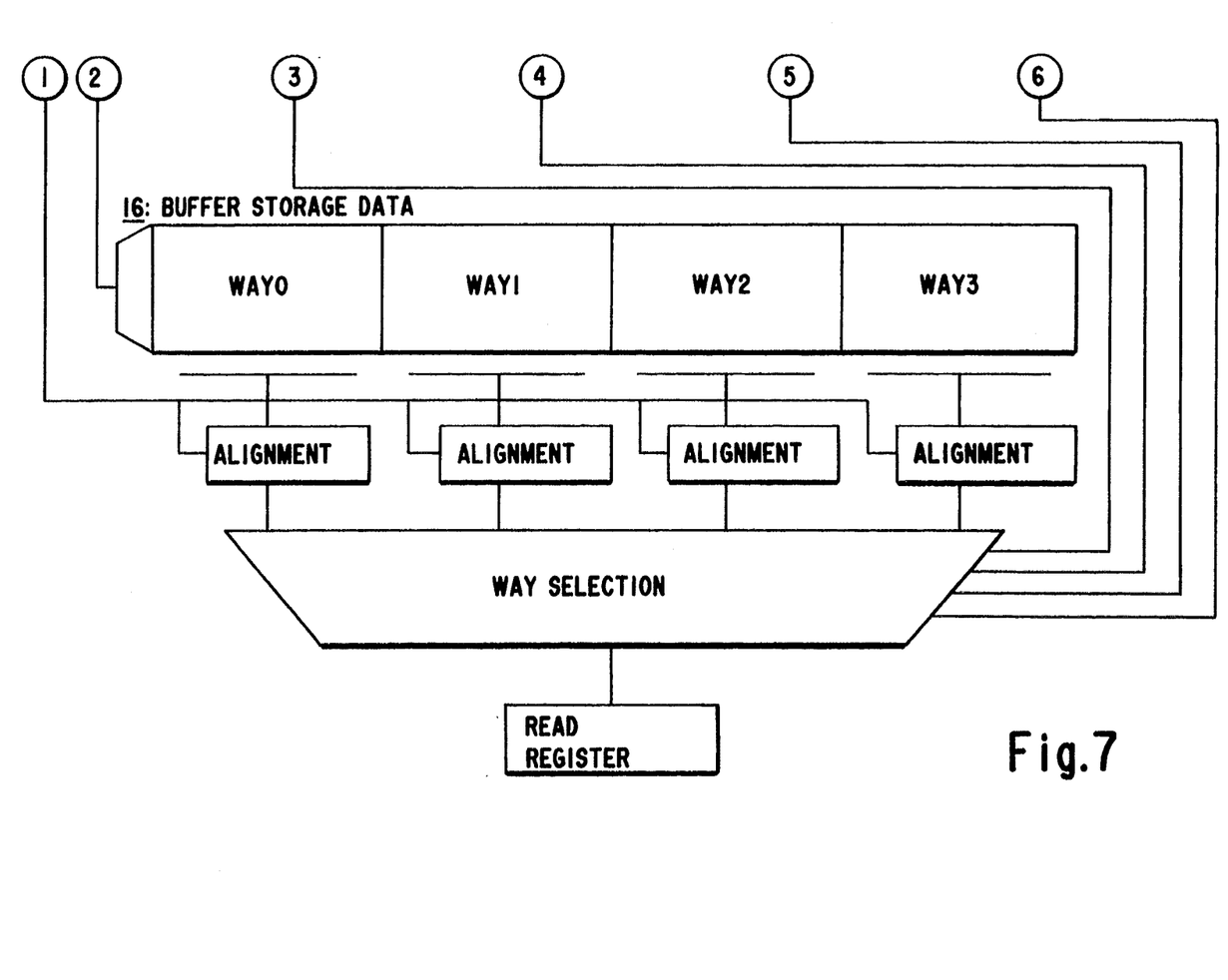

The TLB-14 is a table for a high speed conversion from the logical address to the absolute address (see, FIG. 6). When the TAG1-15 performs the fetch access and store access of the instruction and operand, it determines as to whether or not the data is registered to the buffer storage DATA 16, i.e., the hit/mis-hit is performed, by retrieving based on only the basic line address (see, a flowchart of FIGS. 2 and 3). The buffer storage DATA 16 retrieves the TAG1-15 and the data (instruction and operand) is read when it is hit.

The store buffer 17 holds the store information. The MCU2 is a main storage control apparatus, accesses the MSU (main storage apparatus) and transfers the data in response to the MI request (move-in request) from the S unit 13, the store request, and the TAG retrieval request. In this embodiment, the TAG2-21 is provided for determining the hit/mis-hit of data based on the synonymic line address (see, a flowchart of FIGS. 2 and 3).

Figure 1B:
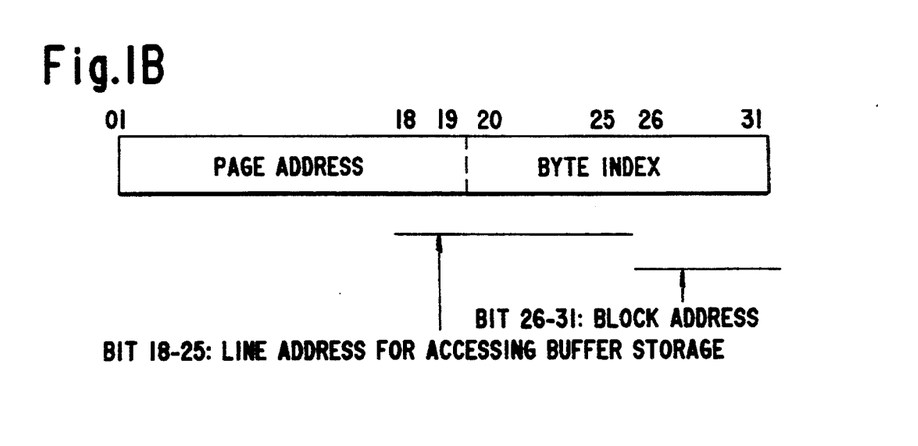
FIG. 1B is a structural view of an address format.

FIG. 1B is one example of an access address of the buffer storage (TAG1, TAG2, DATA portion). As shown in the drawing, the page address is given by bits 01 to 19, and the byte index is given by bits 20 to 31. Further, the block address is given by bits 26 to 31. The buffer storage (TAG1-15, buffer storage DATA-16, TAG1-21) accesses by using bits 18 to 25, i.e., by using a part of the page address (bits 18 and 19) and a part of the byte index (bits 20 to 25).

Accordingly, in the present invention, the TAG1-15 in the S unit of the CPU1 is retrieved and determines the hit/mis-hit so that the present invention retrieves by using the basic line address. The TAG2-21 in the MCU2 are retrieved for the synonymic line address except for the basic line address (three addresses converted from the bits 18 and 19 of the basic line address, or four addresses for the request address from another CPU), and when the data is hit, the TAG1-15 is invalidated. The detailed operation is explained with reference to the drawings below.

Figure 2:
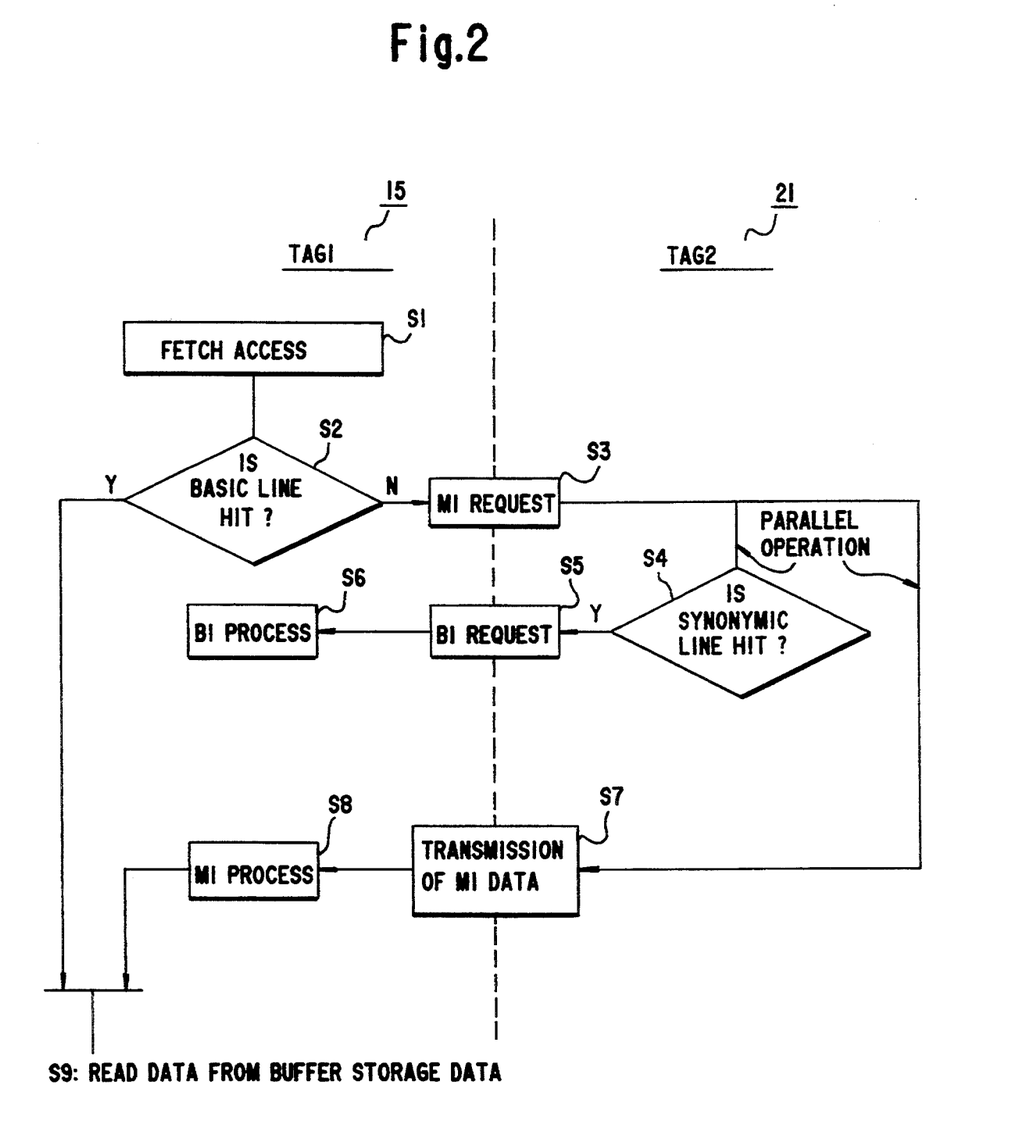
FIG. 2 is an operational flowchart in a fetch access according to the present invention.

FIG. 2 is an operational flowchart at a fetch access according to the present invention. That is, this flowchart is in the case of the fetch access from the pipe line of the S unit 13 in FIG. 1A. In FIG. 2, the fetch access occurs in step S1. In step S2, the TAG1-15 determines as to whether or not this TAG-15 is hit by the basic line address. When the result is YES, since it is clarified that the data exists for the basic line address, the data (in this case, it is an instruction) of the basic line address is read from the buffer storage DATA-16 in step S9, and transfers it to the source of the fetch access request (for example, I unit 11 of FIG. 1A).

On the other hand, when the result is NO, since the data does not exist for the basic line address, the process goes to the step S3. In step S3, the MI request (move-in request) is issued. That is, since the S unit 13 of FIG. 1A retrieves the TAG1-15 based on the basic line address when the step S2 is YES, the S unit 13 issues the MI request to the MCU2.

In step S4, the TAG2-21 determines as to whether or not the data is hit therein. That is, in response to the MI request in step S3, the TAG2-21 in the MCU2 is retrieved for three sets of synonymic line addresses generated from bits 18 and 19 in the basic line address to determine the hit/mis-hit of the data. When the data is hit by any one of the synonymic line addresses, the step S4 is YES, in step S5, the BI request (buffer invalid, i.e., invalid request) is informed to the TAG1-15, in step S6, the entry of the TAG1-15 is invalidated (i.e., the valid bit is reset to "0"). On the other hand, when the result is NO in step S4, the above processes are not performed.

In step S7, the MI data is transferred. In parallel to steps S4, S5 and S6, the data of the fetch access from the MSU3 is moved in step S7, and the address is registered into the TAG1-15 and the valid bit is set to "1" in step S8.

The data is read from the buffer storage DATA-16, and transferred to the source of the fetch access request (for example, the I unit 11 of FIG. 1A).

As explained above, in response to the fetch access from the I unit 11, the TAG1-15 is retrieved. When the data is hit, the data is transferred from the buffer storage DATA-16 to the source of the fetch access request.

On the other hand, when the data is mis-hit, the MI request is informed to the MCU2, the TAG2-21 is retrieved by the synonymic line address (address changed from bits 18 and 19). When the data is hit, the entry of the TAG1-15 is invalidated, and the data from the MSU3 is stored in the buffer storage DATA-16. Further, the address is registered into the TAG1-15 and the invalid bit is set to "1", and the data is read from the buffer storage DATA-16 and transfers to the source of the fetch access. As a result, the TAG1-15 in the CPU1 is retrieved by the basic line address. When the data is mis-hit, the TAG2-21 in the MCU2 is retrieved by the synonymic line address. When the data is hit, the data is invalidated so that it is possible to solve the problem of the synonymity.

Figure 3:
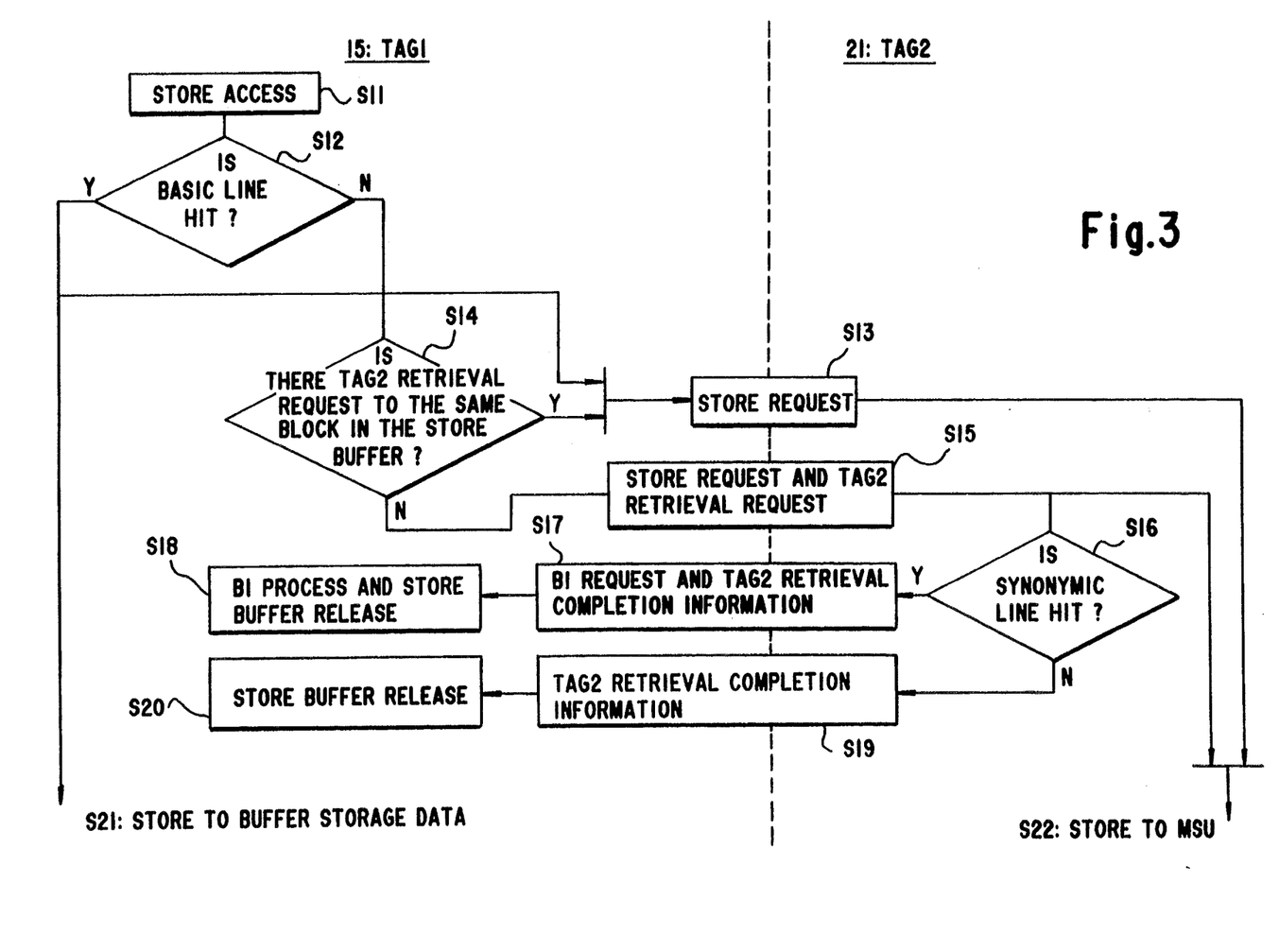
FIG. 3 is an operational flowchart in a store access according to the present invention.

FIG. 3 is an operational flowchart at a store access according to the present invention. This flowchart is in the case of the store access from the pipe line of the S unit 13 in FIG. 1A. In FIG. 3, the store access request occurs in step S11.

In step S12, a determination is performed as to whether or not the TAG1-15 is retrieved by the basic line address. When the result is YES, since it is clarified that the data exists based on the basic line address when the data is hit, the store data is written into the buffer storage DATA-16 in step S21 and the store request is issued. In step S22, the store data is written into the MSU3 (i.e., store-through method). On the other hand, when the result is NO, since it is clarified that the data does not exist based on the basic line address, and the process goes to the step S14.

In step S14, when the result is NO in step S12, the TAG1-15 is retrieved by using the basic line address and the data is mis-hit, a determination is performed as to whether or not there is the retrieval request to the TAG2-15 for the same block in the past. When the result is YES, without retrieval request for the store request and the TAG2-21, the store request is issued in step S13, and the store data is stored to the MSU3 in step S22. On the other hand, when the result is NO, the store request and the TAG2 retrieval request are informed to the MCU2.

In step S16, when the MCU2 receives the store request and the TAG2 retrieval request in step S15, the TAG2-21 is retrieved by the synonymic line address (line address converted from bits 18 and 19 of the basic line address) to determine the hit/mis-hit of data. When the result is YES, since the data is hit based on any synonymic line address, the BI request and the TAG retrieval completion are informed to the S unit 13 of the CPU 1 in step S17, and the BI process (invalidation of the entry of the TAG1-15) and the store buffer 17 are released in step S18. On the other hand, when the result is NO, since all synonymic line addresses are mis-hit, the TAG2 completion is informed to the S unit 13 of the CPU1 in step S19, and the store buffer 17 is released in step S20.

Based on the above processes, in response to the store access from the I unit 11, the TAG1-15 is retrieved and when the data is hit, since the data exists in the buffer storage DATA-16, the store data is written thereto. Further, the store data is also written into the MSU3 (store-through method). On the other hand, when the TAG retrieval request to the same block is stored in the store buffer 17, without retrieval to the TAG2-21, the store data is stored in the MSU3. On the other hand, when the data is not stored, the TAG2-21 is retrieved by the synonymic line address and when the data is hit, the TAG1-15 is invalidated and the store data is written into the MSU3. As a result of the above, it is possible to solve the problem of the synonymity, and to prevent the retrieval to the overlapped TAG2-21 in the same block so that it is possible to improve the processing efficiency for the access.

Figure 4:
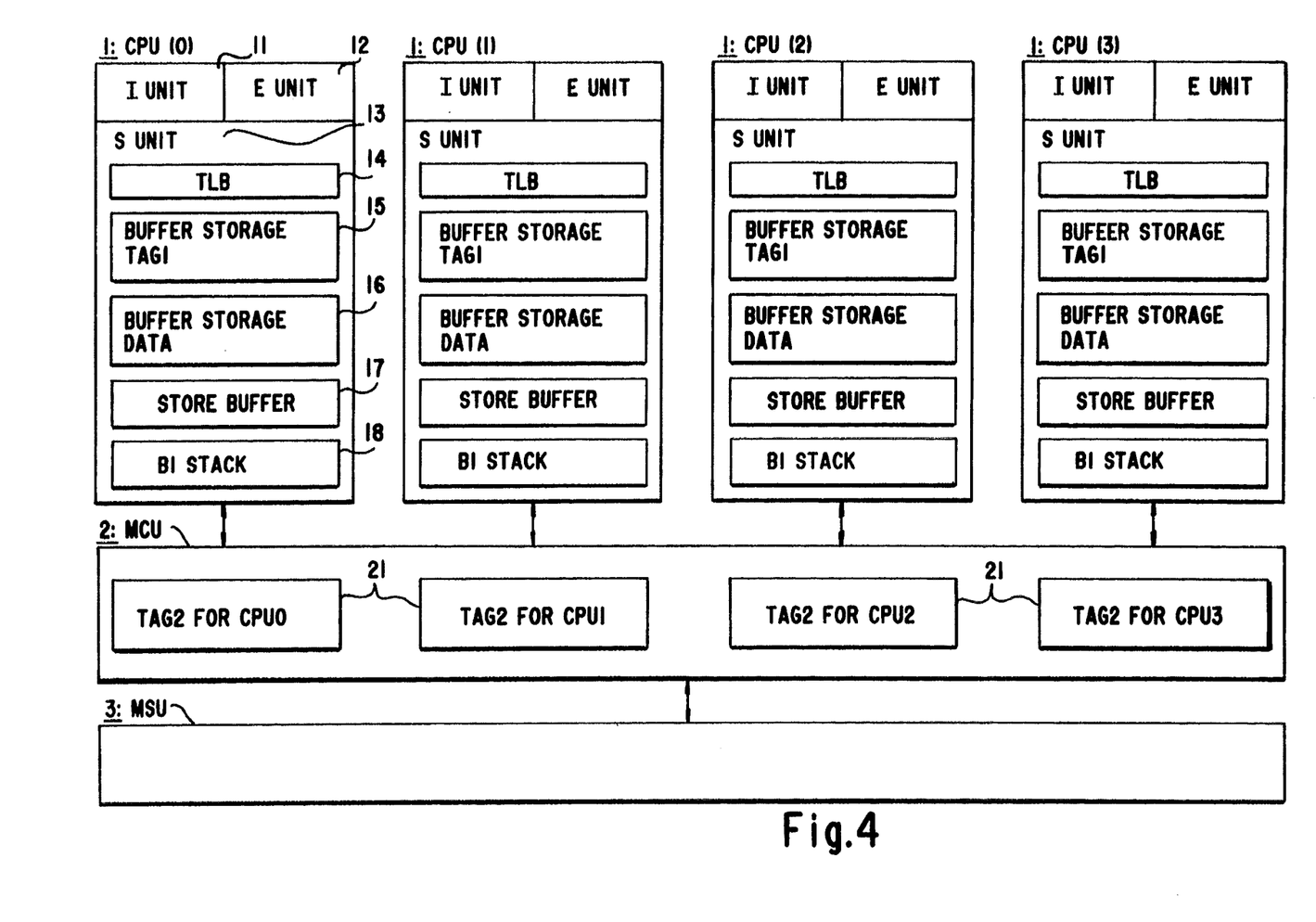
FIG. 4 is a structure according to an embodiment of the present invention.

Next, embodiment and its operation of the present invention are explained with reference to FIGS. 4 to 8. FIG. 4 is a structure of one embodiment of the present invention. In FIG. 4, the CPU (0) to (3) are provided for performing parallel processing, and each has the structure of the CPU1 of FIG. 1A. Each CPU (0) to (3) has a pipe line structure, and, as explained above, performs the fetch access of the operand and fetch/store access of the operand.

As mentioned above, the TLB-14 is a table for converting the logical address to the absolute address with high speed. The buffer storage TAG1-15 is retrieved by using the basic line address and determines the hit/mishit of data, and retrieves whether or not the data is registered in the buffer storage DATA-16. Further, the buffer storage DATA-16 is provided for registering the data, and the store buffer 17 is provided for storing the store information. Further, the BI stack 18 is provided for stacking the BI request (invalidation request).

The MCU2 is a main storage control apparatus, and the CPU0-TAG-21 is provided for the buffer storage TAG1-15 of the CPU (0). Similarly, the CPU (1) to (3) have the CPU0-TAG2-21. In addition to the flowchart of FIGS. 2 and 3, other CPU (1) to (3) are also retrieved and the hit/mis-hit of data is determined and invalidated. Further, the data is stored in the MSU3 and moved-in.

The MSU3 is a main storage unit which is shared and accessed by the CPU (0) to (3).

Figure 5:
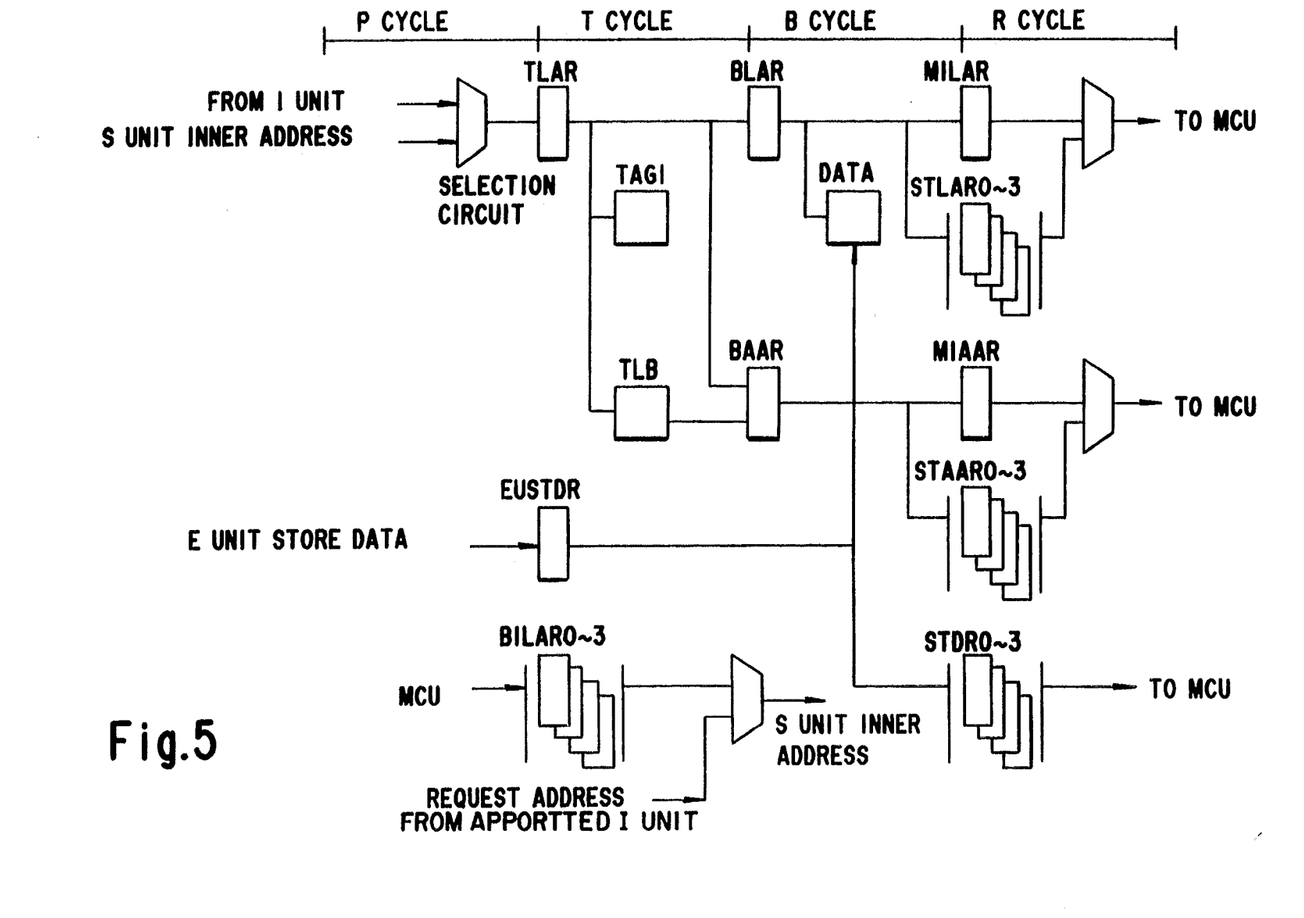
FIG. 5 is one example of an S unit according to the present invention.

FIG. 5 is one example of the S unit structuring the CPU (0) to (3). In this case, the P cycle, the T cycle, B cycle, and R cycle are the stage of the pipe line in the CPU.

In the P cycle, either the request address of the logical address from the I unit 11 or the request address from the S unit is selected by the selection circuit SL. In the T cycle, one logical address selected by the selection circuit SL is set to the TLAR (T cycle logical address register), and the TAG1 (buffer storage TAG1-15) and the TLB are accessed by using this logical address. In the B cycle, the logical address of the TLAR is set to the BLAR, and the DATA (buffer storage DATA-16) is retrieved by using this logical address. Further, the page address of the logical address of the TLAR sets the absolute address converted by the TLB to the BAAR (B cycle absolute address register).

In the R cycle at the fetch cycle, when the required block does not exist on the basic line address of the TAG1, the value of the BLAR is set to the MILAR (move-in-logical address-register), and the value of the BAAR is set to the MIAAR.

Further, in the R cycle at the store access, the value of the BLAR is set to one of numbers 0 to 3 of the STLAR (store-logical address-register), and the value of the BAAR is set to one of the STAAR having the corresponding number of the STLAR. The values of the MILAR and the STLAR, or the values of the MIAAR and the STAAR are sent to the MCU as the request logical address (MRQLAR) to the MCU or the request absolute address (MRQAAR).

On the other hand, in the store access, once the store data from the E unit is received by the EUSTDR (E unit-store data-register), set to one of STDR having the number corresponding to the STLAR, and sends it to the MCU. Further, in the store access, when there is the block of the store access on the basic line address of the TAG1, the data on the EUSTDR is stored in the buffer storage DATA. When the request of the block invalidation for the buffer storage is received from the MCU, the BI stack receives this request. Then, when the buffer invalidation is performed in the CPU, one of the invalidation address BILAR (buffer-invalid-logical address-register) is selected by the selection circuit.

FIGS. 6 and 7 are example of circuits of the TAG1-/DATA portion of the CPU. As mentioned above, the TLB-14 corresponds to the TLB-14 of FIG. 1A, and this is a table for converting the logical address to absolute address with high speed. The buffer storage TAG1-15 corresponds to the TAG1-15 of FIG. 1A, and provided for retrieving the TAG1-15 based on the basic line address to determine the hit/mis-hit of data.

The TLAR is a register for holding the logical address to retrieve the buffer storage TAG1-15 and the TLB-14, and the BLAR is a register for holding the logical address to retrieve the buffer storage DATA-16.

The operation of this circuit is explained below.

(1) The logical address for the fetch/store access is set to the TLAR (see, step S1 of FIG. 2, and step S11 of FIG. 3).

(2) The buffer storage TAG1-15 is retrieved by eight bits address (basic line address) of a part of the page address (bits 18 and 19) of the logical address and a part of the byte index (bits 20 to 25) of the logical address.

(3) At the same time of above (2), the TLB-14 is retrieved by the lower address (bits 12 to 19) of the page address of the logical address, the result (bits 01 to 11) of the logical address is compared with the upper address (bits 01 to 11) of the logical address by the comparator, and when coinciding each other, the match signal is generated.

(4) The absolute address from the buffer storage TAG1-15 which is retrieved by the above step (2) is compared with the absolute address, which is obtained by "PRIMARY" and "ALTERNATE" of the absolute address from the TLB-14 which is retrieved by the above step (3), by the comparator. When the former is coincided with the latter, the value "1" is set to any one of WAY0 to WAY3 matching register.

Based on the above processes, in the fetch access/-store access of FIGS. 2 and 3, the TAG1-15 is retrieved and determines the hit/mis-hit of data (detailed operation is explained by the flowchart of FIGS. 2 and 3). When the data is hit, the data is read from the buffer storage DATA-16, and aligned data is transferred.

Figure 8:
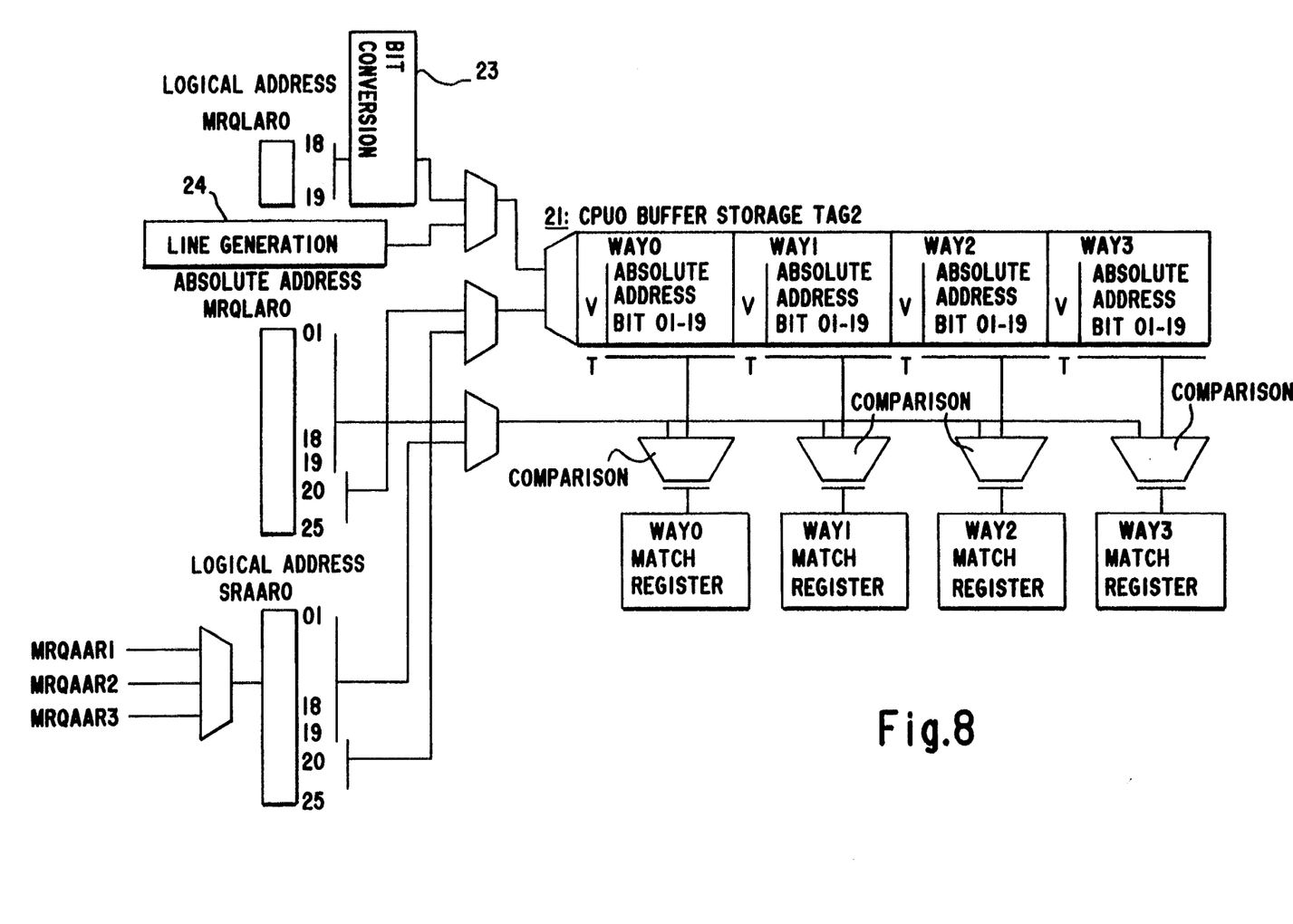
FIG. 8 is one example of a TAG2 in the MCU.

FIG. 8 is one example of the circuit of the TAG2 in the MCU according to the present invention. This circuit is provided in the MCU2 of the CPU (0), and the same structure is provided in the CPU (1) to (3). In FIG. 8, the MRQLAR0 is a register for setting the absolute address (bits 01 to 25) from the CPU (0). The MRQLAR0 is a register for setting the variable portion of the page address of the logical address from the CPU (0), for example, bits 18 and 19. Further, the SRAAR0 is a register for setting the absolute address (bits 01 to 25) from another CPU (1) TO (3) by using the selection circuit.

The bit conversion circuit 23 is a circuit for passing through the basic line address, or for generating three kinds of synonymic line address sequentially converting bits 18 and 19 of the basic line address (or, when it is from another CPU (1) to (3), four kinds of synonymic line address). The line generating circuit 24 is a circuit for sequentially generating the synonymic line address (00,01,10,11) for the request address from the CPU (1) to (3).

The operation of this circuit is explained below.

(1) The absolute address is set to the MRQAAR0 (and SRAAR0), and bits 18 and 19 of the logical address is set to the MRQLAR0.

(2) Total eight bits consisting of bits 20 to 25 of the absolute address of the MRQAAR0, or bits 18 and 19 from the line generating circuit 24 are read as the line address for the CPU0 buffer storage TAG2-21, and these bits 01 to 19 of the absolute address is repeatedly compared with the absolute address 01 to 19 from the MRQAAR0 (or, SRAAR0 of other CPU). The CPU0 buffer storage TAG2-21 is retrieved by using the basic line address and synonymic line address, and the judgement is performed as to whether or not the matched WAY exists. The result is set to the WAY0 to WAY3 match register.

Based on the above process, at the fetch/store access explained in FIGS. 2 and 3, the CPU0 buffer storage TAG2-21 in the MCU2 is retrieved by the synonymic line address and determines the hit/mis-hit of the data (see, flowchart of FIGS. 2 and 3 as detailed operation).

As explained above, according to the present invention, in a store-through method, the TAG1-15 in the CPU1 is retrieved by only basic line address consisting of a part of the page address of the logical address and a part of the byte index of the logical address. When the data is mis-hit, the TAG2-21 of the MCU2 is retrieved by the synonymic line address so that it is possible to prevent deterioration of the performance when the problem of the synonymity is solved, and it is possible to improve the performance of the system.

(1) To solve the problem of the synonymity, the TAG2-21, which is provided for the MCU2 separately operating to the pipe line of the CPU1, performs the retrieval as to whether or not there is the block to be invalidated, and it is possible to execute the access request during retrieval in the TAG2-21, and to ensure no error of the memory access.

(2) For the same block as the previous store access, it is possible to prevent overlapped retrieval for the TAG2-21, and to also prevent deterioration of performance at the solution of the problem of the synonymity.

CAPABILITY OF UTILIZATION IN INDUSTRY

In a data processing apparatus, the apparatus includes a buffer storage used as high speed and small capacity memory elements in a central processing unit (CPU). On the other hand, a main storage includes a low speed and large capacity memory elements. Data blocks separated on the main storage are copied and stored on the buffer storage so that it is possible to achieve high speed access from the central processing unit to the main storage by accessing the data blocks on the buffer storage in the present invention, the buffer storage is controlled by using a part of the page address and a part of byte index as the line address in the store-through method so that it is possible to prevent the deterioration of the performance at the resolution of the problem of synonymity, and to improve performance.

I claim:

1. A buffer storage control system for controlling a buffer storage for a store-through method based on a) a part of a page address of a logical address and b) a part of a byte index of the logical address used as a line address, the system comprising:

a buffer storage for holding data and a first tag portion, said buffer storage and first tag portion provided in a central processing unit to retrieve a hit/mis-hit of data based on a basic line address formed from a) a part of the page address of the logical address and b) a part of the byte address of the logical address; and a second tag portion provided in a main control unit to retrieve the hit/mis-hit of data by using a synonymic line address, said synonymic line address is obtained by changing a variable portion of the basic line address, wherein, in a fetch access, the first tag portion is retrieved by using the basic line address and a) when the data is hit using the first tag portion, the data is transferred from the buffer storage to a device that requested the fetch access request, b) when the data is mis-hit using the first tag portion, 1) the second tag portion is retrieved by using the synonymic line address, 2) when the data is hit using the second tag portion, aa) the first tag portion is invalidated, and bb) the fetch data is moved from a main storage unit to the buffer storage, and transferred to the device that requested the fetch access request, in a store access, the first tag portion is retrieved by using the basic line address and a) when the data is hit using the first tag portion, the data is stored in the buffer storage and the main storage unit, b) when the data is mis-hit using the first tag portion, the second tag portion is retrieved by using the synonymic line address, 1) when the data is hit using the second tag portion, the first tag portion is invalidated, and 2) when the data is mis-hit using the second tag portion, the data is determined to be stored in the main storage unit.

2. A buffer storage control system as claimed in claim 1, wherein, in the store access, the first tag portion is retrieved by using the basic line address and when the data is mis-hit, the second tag portion is retrieved by using the synonymic line address, when the data is using the second tag portion, the following fetch access to the same block is prohibited until one of a) the first tag portion is invalidated, and b) the mis-hit of data is clarified.

3. A buffer storage control system as claimed in claim 1, wherein, in the store access, the first tag portion is retrieved by using the basic line address and when the data is hitted, the retrieval to the second tag portion is omitted when one of a) the second tag portion is retrieved and b) is on retrieval by using the synonymic line address in the previous store access to the same block.

4. A buffer storage control system as claimed in claim 1, wherein, when a second device for the store access request performs the store access, the second tag portion is retrieved by using the synonymic line address including the basic line address and when any one of data is hitted, an entry of the first tag portion is invalidated.

* * * * *